(12) United States Patent
Flögel et al.

(10) Patent No.: US 11,879,430 B2
(45) Date of Patent: Jan. 23, 2024

(54) METHOD FOR DETECTING A SENSOR MALFUNCTION OF A LOAD SENSOR OF A WIND POWER INSTALLATION

(71) Applicant: Wobben Properties GmbH, Aurich (DE)

(72) Inventors: Martin Flögel, Mölln (DE); Enno von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/312,412

(22) Filed: May 4, 2023

(65) Prior Publication Data

US 2023/0358211 A1     Nov. 9, 2023

(30) Foreign Application Priority Data

May 5, 2022    (EP) ..................................... 22171926

(51) Int. Cl.
*F03D 17/00*        (2016.01)
*F03D 80/50*        (2016.01)

(52) U.S. Cl.
CPC ............. *F03D 17/00* (2016.05); *F03D 80/50* (2016.05); *F05B 2260/80* (2013.01); *F05B 2260/83* (2013.01); *F05B 2270/32* (2013.01); *F05B 2270/331* (2013.01); *F05B 2270/808* (2013.01)

(58) Field of Classification Search
CPC ...... F03D 17/00; F03D 80/50; F05B 2260/80; F05B 2260/83; F05B 2270/32; F05B 2270/331; F05B 2270/808
See application file for complete search history.

(56) References Cited

U.S. PATENT DOCUMENTS

2013/0177417 A1    7/2013   Olesen
2022/0178352 A1*   6/2022   Albisu Iso .............. F03D 17/00

FOREIGN PATENT DOCUMENTS

CN       111664061 A     9/2020
DE       10219664 A1     11/2003

* cited by examiner

*Primary Examiner* — Brandon D Lee
(74) *Attorney, Agent, or Firm* — Seed IP Law Group LLP

(57) ABSTRACT

A method for detecting a sensor malfunction of a load sensor of a wind power installation having a rotor and at least one rotor blade, wherein the load sensor is configured to detect a loading variable of one of the rotor blades, and the sensor malfunction involves the functional freezing of a sensor signal from the load sensor, such that it remains temporally constant, wherein at least one loading variable of the rotor blade is estimated and, in the event that the sensor signal is temporally constant, a comparability test is executed wherein, according to the at least one estimated loading variable, a check is executed as to whether a non-constant sensor signal is to be anticipated, and a sensor malfunction is identified by reference to the comparability test.

13 Claims, 6 Drawing Sheets

METHOD FOR DETECTING A SENSOR MALFUNCTION OF A LOAD SENSOR OF A WIND POWER INSTALLATION

BACKGROUND

Technical Field

The invention relates to a method for detecting a sensor malfunction of a load sensor of a wind power installation. The invention moreover addresses a wind power installation in which a method of this type is implemented.

Description of the Related Art

Wind power installations are designed to generate electrical energy from wind. As a result of wind, huge forces are applied to the rotor and rotor blades of the wind power installation. Rotor blades are subject to extreme loading in consequences. Further forces act on the rotor blades, associated with the inherent weight of the latter.

A wind power installation, particularly the rotor blades thereof, must therefore be designed to withstand these loads. Particularly in the case of wind power installations having rotor blades with an individually adjustable pitch angle, measurements of loads arising are required. Under wind conditions which might result in excessively high loading, it must at least be ensured that the wind power installation can be operated safety, or can be shut down if required.

It is therefore necessary for loads acting on the rotor blades to be measured. To this end, typically, load sensors can be fitted to rotor blades for the measurement of loads.

However, an unfavorable circumstance can occur, wherein at least one of the sensors or all the sensors fail, or are subject to another malfunction, e.g., a functional freeze. In this case, the calculation of loading can no longer be ensured. If a sensor is functionally frozen, and thus delivers constant signals, there is a risk that the sensor malfunction might not be detected, on the grounds that the absence of a variation in the signal value over a period of time might also correspond to the actual situation.

This problem might be avoided, e.g., by the fitting of additional redundant sensors to the rotor blade. Loads arising might then be determined in a redundant manner, and a fault detected in the event of any deviations. However, this arrangement has the critical disadvantage of generating high costs, particularly if numerous wind power installations are to be erected, as is customarily the case, e.g., in a wind farm.

BRIEF SUMMARY

Provided are techniques to resolve one or more of the above-mentioned issues, and particularly a cost-effective detection of a sensor malfunction of a load sensor. It is at least intended to propose an alternative solution to previously known solutions.

Provided is a method for detecting a sensor malfunction of a load sensor of a wind power installation having a rotor and at least one rotor blade. The load sensor is configured to detect a loading variable of one of the rotor blades.

The load sensor can thus be a measuring device, or can be understood as a measuring device which detects a loading variable. A loading variable of this type can be a tensile force which acts on the rotor blade, e.g., a gravitational force or a strain of the rotor blade, from which the tensile force can be inferred. In turn, a load acting on the rotor blade can be inferred herefrom. In the event of a high tensile force or a high degree of strain, or the presence of other forces and/or torques, the rotor blade is subject to high loading.

In particular, the load sensor can be a strain gauge strip, which measures strain or torsion in the rotor blade.

The sensor malfunction involves a functional freezing of the sensor signal from the load sensor, such that it remains temporally constant. As a result, the sensor delivers a constant measurement value output.

A measurement value or sensor signal are virtually never constant. Minor fluctuations are to be anticipated, e.g., on the grounds of signal interference or noise associated with electronics. Accordingly, the sensor, or a connected signal processing unit such as an A/D converter, will not deliver an output of an exact value, for example zero, or an exact constant value, even though the sensor is frozen.

The sensor signal of the load sensor is thus functionally frozen in the event that, notwithstanding a variation in the loading variable which physically acts on the rotor blade, this variation is not detected by the load sensor, and the sensor signal thus shows no variation over time, even with respect to noise, even though a variation would have been anticipated.

It is particularly problematic that the sensor signal can also remain virtually constant in the absence of any malfunction, on the grounds of the momentary absence, or the occurrence of only a minute variation in the actual physical loading variable. It is thus not a simple matter to distinguish between an actually constant sensor signal, which is indicative of the absence of a physical variation, and a frozen signal with an associated noise behavior.

The sensor signal of the load sensor is nevertheless detected, and a check is executed as to whether the sensor signal is temporally constant. Moreover, at least one loading variable of the rotor blade is estimated. In particular, a shear force acting on the rotor blade can be estimated from a detected wind speed, or a gravitational force can be estimated from the known weight of the rotor blade and its current position.

If the sensor signal is temporally constant, a comparability test is executed. In the comparability test, according to the at least one estimated loading variable, a check is executed as to whether a non-constant sensor signal is to be anticipated. A sensor malfunction is identified by reference to the comparability test.

The purpose of the comparability test is thus to establish whether a temporally constant sensor signal was not to be anticipated. Accordingly, if the sensor signal is constant, even though this was not anticipated, this is indicative of a sensor malfunction.

The sensor malfunction can thus be identified if the sensor signal is constant, notwithstanding an anticipated variation on the grounds of the comparability test.

An estimated loading variable is a load which is not detected directly, but is inferred from other variables. The first intention is to estimate whether any load whatsoever is acting on the rotor blade. Consequently, an estimated loading variable is not necessarily required to correspond exactly to an anticipated sensor signal. The intention here is only to check the general functional capability of the sensor.

Accordingly, the key concern here is not an accurate estimation of loading, but the establishment of any load variation. Measurement sensors which only measure loads in their direction of measurement can nevertheless measure, in their direction of measurement, a load component of loads applied in a loading direction which deviates from said direction of measurement. A load component of this type, even the absence of accurate knowledge of a load direction, can be sufficient to confirm the presence of a load variation.

According to one aspect, the load sensor is configured in the form of a strain measurement sensor. The load sensor is arranged on the rotor blade, in order to permit the detection of a blade load by reference to strain in the rotor blade. In particular, the load sensor can be fitted to a blade surface.

The load sensor is rigidly attached to the rotor blade, particularly in the region of the rotor blade root. Any bending of the rotor blade will also result in strain in the sensor. The load sensor can thus measure the occurrence of bending, and detect the load applied. Conventional strain measurement sensors can be employed, which can also be described as strain gauge strips. By means of the proposed method, a malfunction can thus be investigated using a conventional strain measurement sensor, particularly with no additional hardware, and particularly with no additional sensors.

According to a further aspect, the at least one estimated loading variable is a gravitational load acting on the rotor blade. A blade load is generated by a weight force acting on the rotor blade. In particular, the estimated gravitational load is determined by reference to a rotor position of the rotor.

As a result of the inherent weight of the rotor blade, a weight force is generated, resulting in the application of a bending moment to the rotor blade, which is understood as a gravitational load. However, the bending moment varies in response to change in the position of the rotor blade.

For example, if the rotor blade is in a 6 o'clock or 12 o'clock position, and is thus perpendicular, the bending moment, i.e., the gravitational load, is equal to zero. Conversely, the gravitational load is at a maximum where the rotor blade is in a 3 o'clock or 9 o'clock position, and is thus horizontal.

The rotor position can also be described as the rotor angle. The rotor position thus indicates the location of the rotor blade in the rotor plane, and can be expressed in the form of an angle.

Typically, the characteristic of the estimated gravitational load is a sinusoidal characteristic, according to the rotor angle or rotor position. For the accurate determination of the gravitational load, a pitch angle of the rotor blade can also be considered. The pitch angle influences the direction in which the load acts on the rotor blade, i.e., the loading direction. The respective load sensor is assigned, in a fixed manner, to one direction, which can be described here as the sensor direction or measurement direction. In the event of a change in the loading direction associated with a shift in the pitch angle, e.g., away from the sensor direction, the amplitude of the load component in the measurement direction is reduced. The load sensor thus detects a reduced amplitude.

A tilt angle of the rotor plane vis-à-vis a perpendicular plane, or a tilt angle of a rotor axis vis-à-vis a horizontal axis, can also be considered. The tilt angle also influences the loading direction.

According to a further aspect, the at least one estimated loading variable is a wind load acting on the rotor blade, which is dependent upon a wind speed.

Wind acts on the rotor blade, according to the wind speed. The higher the wind speed, the stronger the action of wind on the rotor blade.

The term wind load is thus to be understood as forces, particularly shear forces, and/or moments, such as bending moments, which are associated with the shear action of wind on the rotor blade.

In particular, as a result of the incidence of wind, the rotor blade undergoes an uplift, which is dependent upon the wind speed. Loads associated with uplift, such as a lift force and/or bending moments, are also understood as a wind load on the rotor blade. Wind acts on the rotor blade accordingly.

The wind load is also dependent upon the wind direction. Particularly in the context of the present application, a wind load is to be understood as a wind load in the wind direction.

If the estimated loading variable is a wind load, it is thus determined which loads, associated with wind, are acting on the rotor blade, according to the wind speed. A wind load is thus a load which is generated by the action of wind on the rotor blade. This can occur, or can be detected in the form of a bending moment, i.e., a torque, in the region of the blade root. This bending moment or torque can constitute the loading variable. To this end, wind speed can be measured, for example by means of a LiDAR measurement and/or an anemometer measurement. LiDAR measurements or anemometer measurements permit a simple variant, by way of wind speed, to be determined. From the wind speed, the loading variable, i.e., the wind load, can then be inferred, optionally in consideration of the pitch angle of the rotor blade and/or the tilt angle, together with the rotor speed.

The wind load is preferably determined in accordance with a state variable which is dependent upon wind speed. In particular, a state variable of this type comprises a generated power, an acceleration power and/or a generator torque detected. The pitch angle can also constitute a state variable.

Thus, for the estimation of wind load, at least one state variable is employed. The state variable itself can be dependent upon wind speed.

The state variable can be a generated power and/or an acceleration power. Acceleration power of the rotor is calculated in consideration of the rotor speed, the rotor acceleration and a moment of inertia, and is representative of a power take-up from wind. In particular, a power which is representative of wind speed is thus considered as a state variable. The power take-up of the rotor, according to the wind speed, is thus representative of wind speed. The wind speed and/or the loading variable can also be determined, and particularly estimated, in consideration of electric power generated and rotor acceleration. The wind load can also be determined or estimated directly from power. For the wind load M and power P to be estimated as status variables, the following relationship can be assumed:

$$M \propto \sqrt{P}.$$

The wind load M is thus calculated as proportional to the root of the power P. From the power thus detected, i.e., particularly from a detected output power of the wind power installation, the loading variable can thus be determined directly by means of a proportionality factor, which can be derived from measurements or empirical values.

According to a further aspect, by the execution of a comparability test with respect to at least two estimated loading variables, a check is executed as to whether a sensor malfunction is present. The first loading variable is the estimated gravitational load. The second loading variable is the estimated wind load.

It is particularly advantageous that both the estimated wind load in the wind direction and the estimated gravitational load are considered. These two loading variables are mutually perpendicular such that, for each pitch angle of the rotor blade, at least one load in the measurement direction can be estimated. If loading variables are estimated in one direction only, in many situations, depending upon pitch angles and sensors, it might not be possible to check whether a variation in the sensor variable is to be anticipated or otherwise.

By the consideration of both the gravitational load and the wind load, it is thus ensured that, independently of the pitch angle of the rotor blade, at any time, at least one load component is available in the measurement direction of the load sensor, and the actual presence of a corresponding load can be taken into consideration.

In the comparability test, any loading variable, and particularly a variation in any loading variable, can thus be considered. It is sufficient to establish, on the basis of a loading variable, that the sensor signal is not constant, i.e., that a variation in the sensor signal is to be anticipated.

According to a further aspect, a projected loading variable is determined, by way of an estimated loading variable projected for a measurement direction of the load sensor. The projected loading variable is thus the estimated loading variable, projected for a measurement direction of the load sensor.

The load sensor measures effective forces, or other measured variables, in the measurement direction thereof. If the load is nor oriented exactly in the measurement direction, only a proportion thereof will be detected, namely a projected proportion, i.e., the projected load.

On the grounds of the measurement direction, loads arising, optionally, can thus be measured in a proportional manner only. For the appraisal of the presence of a sensor malfunction, it is therefore advantageous to project the estimated loading variable for the measurement direction of the load sensor. The projected loading variable is thus the load which the load sensor is intended to measure.

The projected loading variable can thus be both an estimated wind load, projected for the measurement direction of the load sensor, and an estimated gravitational load, projected for a measurement direction of the load sensor.

The measurement direction of one load sensor can correspond, e.g., to a pivoting direction, and that of a further load sensor to a direction of impact of the rotor blade, in any event where the pitch angle is 0°. An arrangement of this type is particularly appropriate, where only two load sensors, or two pairs of load sensors are employed. To this end, load sensors are customarily arranged in the blade root region of the blade surface, in the longitudinal blade direction, but mutually offset about the blade root through an angle of 90°. However, exact positioning cannot be achieved. By means of the method, it is also possible to identify a sensor malfunction in a load sensor using another sensor assembly. This can be considered in the corresponding projection.

In the comparability test, according to the projected loading variable, a check is then executed as to whether a constant sensor signal is to be anticipated, or whether a non-constant sensor signal is to be anticipated.

In particular, in the comparability test, any variation in the projected loading variable is considered. If the sensor signal is constant, this can also be attributable to the fact the load sensor, on the grounds of its measurement direction, cannot capture any component of the loading variable. A critical factor in the check as to whether a change in the sensor signal would be anticipated is thus the proportion of the estimated loading variable in the measurement direction, i.e., the projected loading variable. In particular, in the comparability test, by reference to both projected loading variables, a check is executed as to whether a non-constant sensor signal was anticipated.

Depending upon the measurement direction and projection, it is conceivable that a first loading variable might not be perceptible in one sensor. The first loading variable estimated for this purpose would thus give rise to the expectation of a constant signal. However, a different and second loading variable, together with any load variations, may be perceptible in the same sensor. In the event of any change in this second loading variable, it would be anticipated that the sensor signal is not constant, thus permitting the presence of a frozen sensor to be inferred. Consequently, this involves the determination as to whether a non-constant sensor signal was anticipated. By a check as to whether a constant sensor signal was anticipated, naturally, an indirect check is also executed as to whether a non-constant sensor signal was anticipated.

At least two load sensors are connected to the rotor blade. The load sensors assume different measurement directions. In particular, load sensors are arranged on the rotor blade surface in the region of the blade root, and measure strain or compression in the longitudinal direction of the rotor blade. This strain or compression is attributed to a bending moment, or a bending moment is determined therefrom.

In particular, it is conceivable that load sensors are respectively employed in pairs, wherein two load sensors in a pair are mutually offset about the rotor blade through an angle of 180°. Essentially, they are arranged in mutual opposition. In simple terms, they can be described as an upper and lower sensor, or as a front and rear sensor. In this paired arrangement, the bending moment can be inferred from the respectively prefixed strain values from sensors in the same pair. In the event of two sensor pairs, two bending moments are thus detected, each having a bending axis about which any bending is oriented. These two bending axes are ideally mutually perpendicular. Bending directions, and thus the measurement directions, are thus mutually perpendicular.

It is thus particularly advantageous if the measurement directions of the load sensors are mutually perpendicular.

According to a further aspect, if it has been detected that the sensor signal is temporally constant, in the comparability test executed according to the at least one estimated loading variable, and particularly according to the at least one projected loading variable, it is determined whether a temporally non-constant sensor signal was anticipated. Depending upon the anticipation of a temporally non-constant sensor signal, a sensor malfunction can be identified. By way of a precaution, it should be observed that an actual loading variable is never exactly constant, but can feature fluctuations, the magnitude of which is so small that they lie below a limiting value which is sufficiently low such that any values which undershoot the latter can be classified as constant. In this context, the term "constant" is to be understood in this sense.

Firstly, a check is thus executed as to whether the sensor signal is temporally constant. If this is not the case, the sensor is manifestly not frozen. However, if it is detected that the sensor signal is temporally constant, a check is executed as to whether a non-constant sensor signal was anticipated and whether, in consequence, a variation was anticipated. To this end, in the comparability test, the estimated loading variable is considered. If this is also temporally constant, the temporally constant sensor signal is explainable. Otherwise, a frozen sensor can be assumed.

It is particularly advantageous that the projected loading variable should be considered, in order to appraise whether it was anticipated that the sensor signal should be temporally non-constant, i.e., whether a variation thereof was anticipated. As the sensor signal, on the grounds of the measurement direction, only measures a proportion of loads, it is advantageous to project the estimated loading variable for this measurement direction, i.e., to employ the projected loading variable.

If the sensor signal is temporally constant and, according to the estimated loading variable, a temporally constant sensor signal is also to be anticipated, no sensor malfunction is identified. Conversely, a sensor malfunction is identified, if the sensor signal is temporally constant, but the estimated and projected loading variable is not. It is conceivable that, although the loading variable is not constant, the variation thereof further to projection in the measurement direction assumes such a small amplitude that a temporally constant sensor signal is nevertheless plausible, and is thus to be anticipated. This is the case, e.g., if the measurement direction is approximately perpendicular to the load, and the proportion which can be measured by the load sensor is negligibly small.

Whether a temporally non-constant sensor signal is to be anticipated can also be dependent upon both the estimated wind load and the estimated gravitational load.

In the absence, e.g., of any wind load which generates a bending moment in a direction not corresponding to a measurement direction of a load sensor, this measuring device can nevertheless detect a proportion of the wind load, provided that the wind load is not perpendicular to the measurement direction of the load sensor. However, if the wind load is not detectable, or is only poorly detectable by this load sensor, on the grounds that it is generally of a low magnitude and/or is completely or virtually perpendicular to the measurement direction, it can nevertheless be detected that a variation in the sensor signal would have been expected, if a change on the grounds of varying gravitational loads is anticipated. Such gravitational loads are essentially perpendicular to the wind load in the wind direction, and thus at least one of these two loads, i.e., the wind load or the gravitational load, on the grounds of the direction thereof, is detectable by the relevant load sensor.

Gravitational loads in particular can be accurately estimated, such that estimated gravitational loads are preferred for the purposes of appraisal, provided that the direction and amplitude thereof are appropriate.

According to a further aspect, in the comparability test for appraising whether a temporally non-constant sensor signal is anticipated, a check deviation is generated. The check deviation represents a difference between the projected loading variable at a current time point, and the projected loading variable for a time point at which the sensor signal was last not detected as temporally constant.

The check deviation is compared with a specified limiting value. If the check deviation does not exceed the limiting value, and thus only a very small variation occurs, it will then be anticipated that the sensor signal is temporally constant, or in any event lies within a tolerance margin. In particular, for different loading variables considered, different limiting values are specified. In particular, for the check deviation with respect to the gravitational load, and for the check deviation with respect to the wind load, a different limiting value is specified in each case.

The projected loading variable is thus repeatedly determined and saved in a continuous manner, e.g., at discrete time intervals. Immediately it is detected that the sensor signal is temporally constant, the projected loading variable is no longer saved. The check deviation represents the difference between the projected loading variable at a current time point and the most recently saved projected loading variable. The check deviation thus represents the anticipated, but yet to be observed variation in the sensor signal.

Provided that the check deviation does not quantitatively exceed a specified limiting value, no variation in the sensor signal is to be anticipated. In consequence, a constant sensor signal does not result in the identification of a sensor malfunction. The check deviation thus remains within a specified tolerance range.

On the grounds that, for the various loads considered, different limiting values are stipulated for the check deviation, it is considered that the lower the stipulated limiting value selected, the more accurate an estimate of loading is possible.

According to a further aspect, if the sensor signal has been detected as temporally constant but, by the execution of the comparability test, it is established that a temporally constant signal was not anticipated, a counter is advanced. If the counter reaches a predefined threshold value, a sensor malfunction is identified.

This check as to whether the sensor signal has been identified as temporally constant, the advancement of the counter which is dependent thereupon and the check as to whether the predefined threshold value has been achieved, are repeated successively and, in particular, are repeated in a continuous manner.

Advantageously, in a counter of this type, a setting can be executed as to the degree of sensitivity with which a sensor malfunction is to be detected. Thus, a temporally constant sensor signal, which was not anticipated, will initially result only in the advancement of the counter. It can thus be prevented that individual outlying estimated values result in the spurious detection of a frozen sensor, without the necessity for setting the limiting value of the check deviation so high that faults remain undetected.

According to a further aspect, the counter is moved back in the event that, during the comparability test, a change in the sensor signal has been detected. The counter is moved back in the event that a sensor signal which was initially detected as constant is detected as non-constant at a later time point. The counter is thus moved back to a starting value, particularly to zero.

The principle considered here is that even a one-off variation in the sensor signal provides proof that the sensor is not frozen. The counter, and thus the test routine as a whole, can thus be completely reset.

Conversely, if the sensor signal is detected as temporally constant, and it is simultaneously anticipated that the sensor signal will be constant, the counter is left at a current value.

Thus, in both cases, a check is firstly executed as to whether the sensor signal has changed. If the sensor signal has changed, the counter is moved back on the grounds that, in this case, the sensor is manifestly not frozen.

In the absence of any variation in the sensor signal, which is detected as temporally constant, a check is executed in the comparability test as to whether the sensor signal should have changed.

Likewise, if a variation in the sensor signal is not anticipated, the counter is left at its current reading, as it can neither be inferred herefrom that the sensor is frozen, or that it is not.

If it is detected that, notwithstanding a constant behavior, a variation in the sensor signal would have been anticipated, e.g., on the grounds of an overshoot of the check deviation in excess of the limiting value, the counter is advanced, as this is indicative of a frozen sensor. This above-mentioned criterion for the advancement of the counter is thus further applied.

Thus, according to aspects involving the employment of the counter, the counter is evaluated in sequential time steps. To this end, a threshold value is stipulated for the counter. A sensor malfunction is detected, or a sensor malfunction is identified, if the counter achieves or exceeds the threshold value.

Evaluation of the counter is repeated successively. By reference to the comparability test, a repeated check is thus executed as to whether the sensor signal is temporally non-constant. In particular, repeated checking is executed for such time as the counter has not achieved the threshold value.

The counter is thus evaluated in an iterative manner. To this end, fixed time steps can be defined, at which evaluation is executed. For example, the counter can be evaluated every 10 ms. Only in the event of the achievement or overshoot of the threshold value by the counter is a sensor malfunction identified. However, in the event of a premature variation in the sensor signal, the counter is moved back, and no sensor malfunction is identified.

The method is restarted, namely, with the counter set to zero, immediately a temporally constant sensor signal is again detected.

According to a further aspect, in the comparability test, in the event of a constant sensor signal, a gravitational load comparison is executed by way of a comparison with an estimated gravitational load, and a wind load comparison is executed by way of a comparison with an estimated wind load. In each check, an identical or the same counter are respectively advanced by one upward increment, if it is established that a non-constant sensor signal is anticipated. A sensor malfunction is assumed, if the counter has achieved a or the stipulated threshold value. In the gravitational load comparison, a different upward increment is preferably applied to that employed in the wind load comparison.

The comparability test is thus executed with reference to an estimated gravitational load, and with reference to an estimated wind load. For the check as to whether a non-constant sensor signal is anticipated, the respective projected loading variables thereof can be employed.

To this end, for both the gravitational load comparison and the wind load comparison, a check deviation can be formed, in order to determine whether a variation in the sensor signal should have occurred.

The gravitational load comparison and the wind load comparison are executed in a mutually independent manner. In practice, however, the same counter is always advanced, preferably by different upward increments. Accordingly, if a variation is anticipated on the grounds of a comparability test, the counter is not advanced by a flat-rate increment of one, but by the upward increment, i.e., a variably definable constant. It is thus sufficient if, according to the outcome of one of the comparability tests, a variation in the sensor signal should have occurred, for the advancement of the counter to proceed.

If, on the basis of an estimated loading variable, e.g., the gravitational load, the outcome of the comparability test thus indicates that a constant sensor signal is anticipated, the counter would initially be left at its current reading. If, however, it proceeds from another comparability test, in the present example thus the wind load comparison, that a variation in the sensor signal is anticipated, the counter is advanced by the relevant upward increment associated with the wind load or the wind load comparison. It is thus sufficient if one loading variable is appropriate for testing, particularly if the latter is appropriate on the grounds of the direction thereof with respect to the measurement direction of the sensor.

However, if both loads are appropriate for testing, the counter is optionally advanced more rapidly, such that a malfunction can be detected more rapidly. Consideration of a single meter thus provides a further advantage, in that a sensor malfunction can be identified in a particularly rapid manner.

The upward increment itself, for each comparability test, can be dependent upon a working point of the wind power installation. In particular, it is proposed that the upward increment should be set in accordance with the rotational speed (of the rotor and/or of the generator) and/or in accordance with the capacity of the wind power installation which, respectively or in combination, can characteristically define the working point. In particular, the upward increment for gravitational loads can be selected as speed-dependent, i.e., according to the rotational speed of the wind power installation, i.e., of the rotor and/or of the generator of the wind power installation. Thus, in a gravitational load comparison, the higher the speed, the more rapidly the counter will advance.

In each case, the upward increment can be selected for the predefinition of how rapidly, at the latest, a sensor malfunction is to be identified. The term "how rapidly" can refer to a specific time, to a comparative outcome, or to a comparative behavior.

For the gravitational load comparison, this increment can be, e.g., a rotation of the rotor through a specific angle. The upward increment can thus be selected such that, further to a rotation of the rotor, e.g., through 90°, the threshold value would be achieved, unless the counter were to be additionally advanced by the wind load comparison, in which case this would occur more rapidly still.

Conversely, in the wind load comparison, the upward increment is selected such that the threshold value is achieved, at the latest, further to a predefined time interval, e.g., after 4 seconds. Thus, if the sensor signal is constant for 4 seconds, whereas the continuous wind load comparison does not give rise to the expectation of a constant value, the counter will achieve the threshold value and a sensor malfunction is detected, unless the counter were to be additionally advanced by the gravitational load comparison, in which case this would occur more rapidly still.

By the selection of upward increments, it can thus be dictated how rapidly a sensor malfunction is detected, should such a malfunction be present. This provides an advantage, in that errors in the comparability test will not immediately result in the identification of a sensor malfunction, such that any spurious fault identifications can be avoided.

In the event of multiple loads, different upward increments will generate the advancement of the same counter, as a result of which the threshold value will be achieved in a particularly rapid manner, and the sensor malfunction will be rapidly identified.

According to a further aspect, the sensor signal is assumed to be noisy or above a decibel threshold. The sensor signal is identified as temporally constant, if the sensor signal fluctuates or varies about a predefinable fluctuation amplitude, or the magnitude of variation thereof does exceed a predefinable variation amplitude.

It has thus been recognized that an exactly constant signal is not to be anticipated, even if the sensor is frozen. Accordingly, a variation is only identified as a variation if the sensor varies in excess of a threshold. The fluctuation amplitude or variation amplitude represent such a threshold. Notwithstanding, in order to permit the detection of a frozen sensor signal, a fluctuation amplitude or variation amplitude is thus permitted, wherein both can also be described as a permissible noise amplitude. A fluctuation about a signal value is thus permitted, within which a temporally constant sensor signal is still assumed. A threshold can also be stipulated. In the event of a variation in the sensor signal, within a given time step, by a margin which undershoots the stipulated threshold, a constant signal is detected.

According to the invention, a wind power installation is further proposed, having a load sensor, a rotor and at least one rotor blade. The wind power installation is configured to execute a method for detecting a sensor malfunction according to one of the above-mentioned aspects. In particular, the wind power installation comprises a measurement and control device, on which the method for detecting a sensor malfunction is implemented.

BRIEF DESCRIPTION OF THE SEVERAL VIEWS OF THE DRAWINGS

The present invention is further described in greater detail hereinafter by reference to examples, in consideration of the figures. Identical reference symbols identify the same or similar elements.

DETAILED DESCRIPTION

Figure 1:
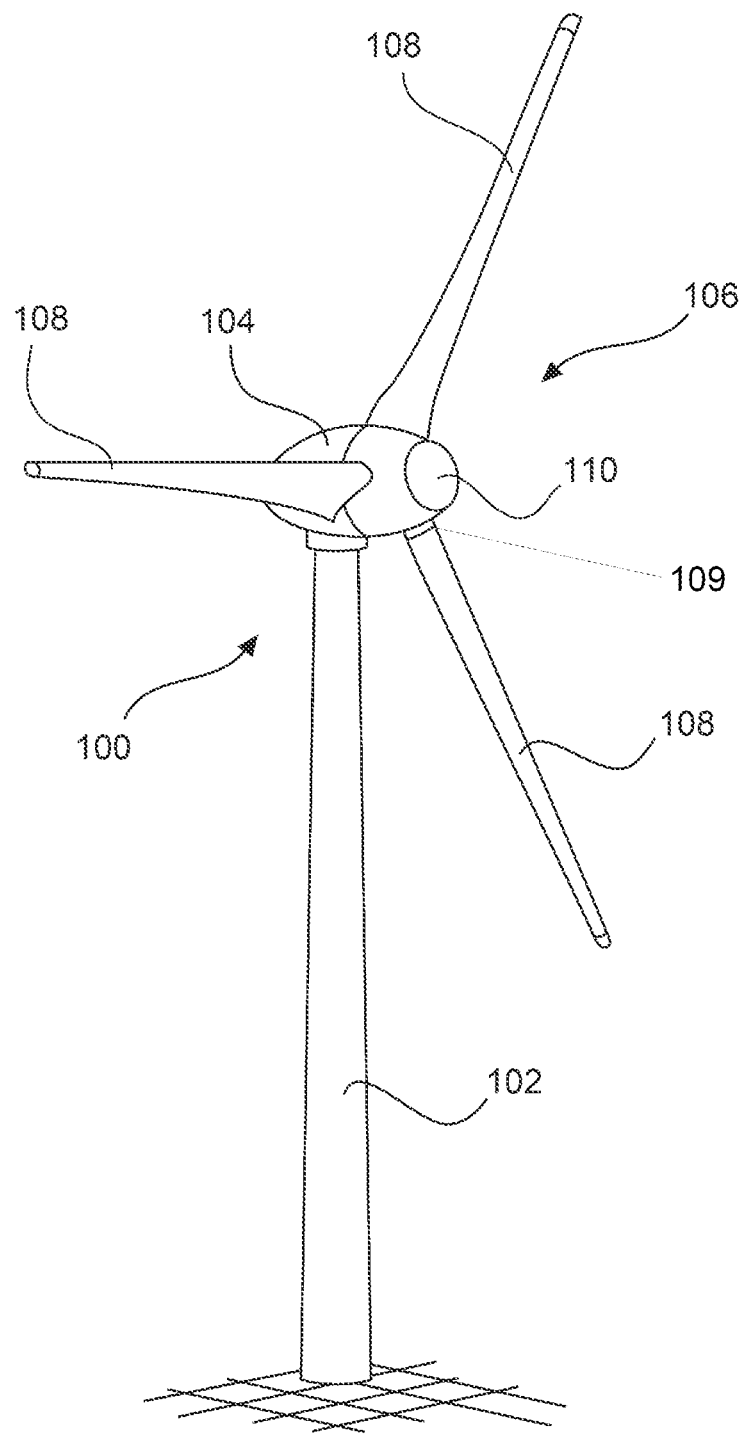
FIG. 1 shows a perspective view of a wind power installation.

FIG. 1 shows a schematic representation of a wind power installation according to the invention. The wind power installation 100 comprises a tower 102 and a gondola 104 on the tower 102. On the gondola 104, an aerodynamic rotor 106 having three rotor blades 108 and a spinner 110 is provided. The aerodynamic rotor 106, during the operation of the wind power installation, is set in rotary motion by the action of wind, and thus additionally rotates an electrodynamic rotor or armature of a generator, which is directly or indirectly coupled to the aerodynamic rotor 106. The electric generator is arranged in the gondola 104, and generates electrical energy. The pitch angle or the rotor blades 108 can be adjusted by pitch motors at the rotor blade roots 109 of the respective rotor blades 108.

A load sensor is connected to at least one of the rotor blades 108. In particular, each rotor blade 108 comprises at least two, and particularly two pairs of load sensors.

Figure 2:
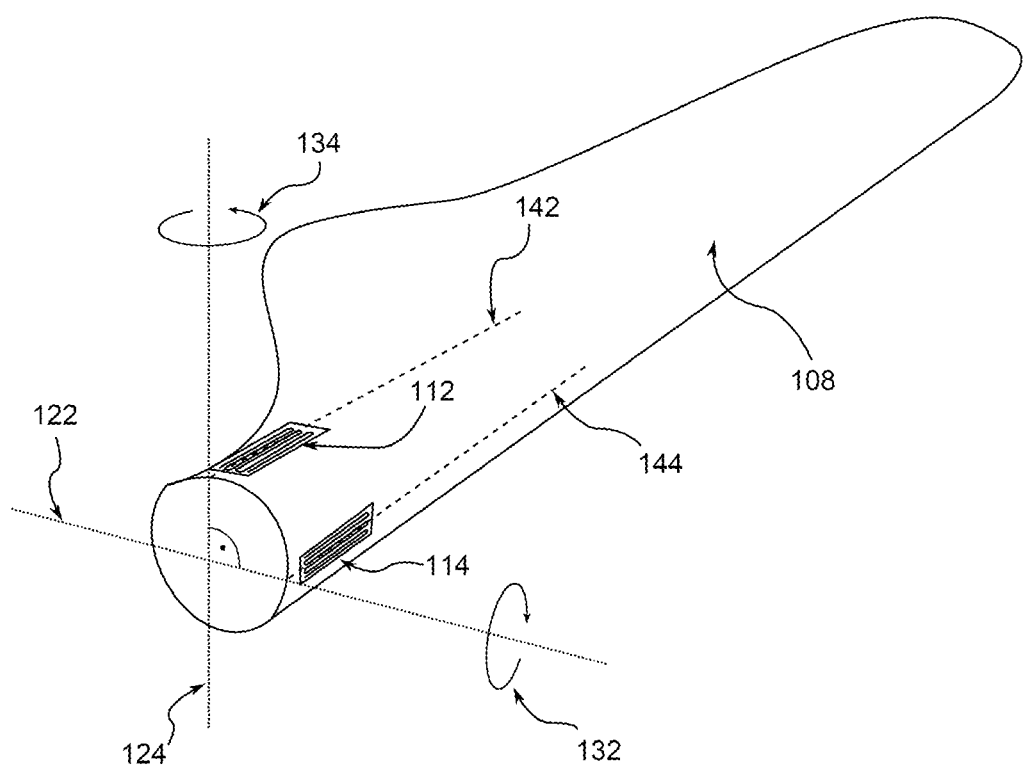
FIG. 2 shows two load sensors, fitted to a rotor blade.

FIG. 2 shows a rotor blade 108, to which a first and a second load sensor 112, 114 are fastened. The load sensors are arranged such that they are offset about the rotor blade through an angle of 90°.

In the event of bending of the rotor blade, strain is measured by the load sensors 112, 114. Strain which is measured by the first load sensor 112 is converted into a first bending moment 132, and strain which is measured by the second load sensor 114 is converted into a second bending moment 134. To this end, a first bending axis 122 is defined for the first load sensor 112, and a second bending axis 124 is defined for the second load sensor 114, about which the bending moment 132 or 134 is respectively calculated.

The two bending axes 122, 124 are mutually perpendicular, wherein the same also applies to the bending moments, in the sense that the bending moments 132, 134 which are defined by means of the two load sensors assume mutually perpendicular bending axes 122, 124. The directions in which the bending moments are applied can be considered as measurement directions such that, accordingly, the measurement directions are also mutually perpendicular. This is achieved by the offset arrangement of the load sensors 112, 114 through 90°. Accordingly, the first load sensor 112 is arranged in a first strain direction 142 along the longitudinal direction of the rotor blade, and the second load sensor 114 is arranged in a second strain direction 144, likewise along the longitudinal direction of the rotor blade.

Figure 3:
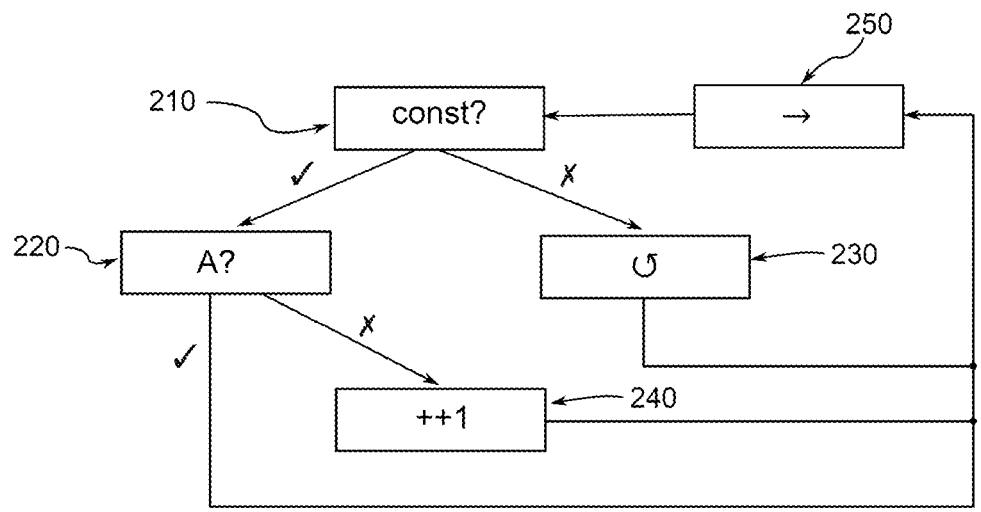
FIG. 3 shows a method according to an embodiment of the invention.

FIG. 3 shows a method according to an embodiment of the invention.

Firstly, a sensor signal from the load sensor is detected.

In a constancy check step 210, a check is then executed as to whether the sensor signal is temporally constant, i.e., the sensor signal is functionally frozen. Fluctuations, e.g., caused by evaluation electronics, are also detected as temporally constant.

If it is detected, in the constancy check step 210, that the sensor signal is temporally constant, an anticipation step 220 is executed. In the anticipation step 220, the comparability test is then executed. A check is further executed as to whether the temporally constant sensor signal was anticipated, or whether a temporally non-constant sensor signal was anticipated. This is executed in accordance with at least one estimated loading variable of the rotor blade.

If it is determined, in the anticipation step, that a temporally constant behavior is not anticipated, a counter is advanced in an advancement step 240.

Otherwise, i.e., if it is established in the anticipation step 220 that a temporally constant sensor signal was to be anticipated, the counter is left at its current reading.

There then follows an evaluation step 250, which is executed in any case, i.e., even in the event that an advancement of the counter has been executed in an advancement step 240.

If, however, in the constancy check step 210, it is already established that the sensor signal is temporally non-constant, or that the sensor signal has changed, a reset step 230 is executed. In the reset step 230, the counter is reset, i.e., is set back to zero.

Further to the reset step 230, the evaluation step 250 is likewise executed.

In the evaluation step 250, the counter is evaluated. Depending upon the reading, a sensor malfunction is identified.

If the presence of a sensor malfunction is detected, a warning message is generated. Optionally, the wind power installation is shut down, or is switched to a safe operating mode.

If, on the basis of the counter reading in the evaluation step 250, no sensor malfunction is identified, the method recommences for a subsequent time step, wherein a further sensor signal from the load sensor is detected and, in the constancy check step 210, a check is executed as to whether the sensor signal is temporally constant. The method is thus repeated continuously.

The method is thus essentially based upon the outcome of the anticipation step 220.

To this end, in the anticipation step, a loading variable of the rotor blade is estimated. A distinction is drawn between a gravitational load and a wind load. In the anticipation step 220, a gravitational load and a wind load are estimated accordingly.

Both the estimated gravitational load and the estimated wind load are projected for the measurement direction of the load sensor. For both projected loading variables, a check deviation is determined. The check deviation is expressed as the difference between the projected loading variable at a current time point and the projected loading variable at the time at which the sensor signal was identified as temporally constant.

Any check deviation which exceeds a stipulated limiting value, whether for the estimated gravitational load or for the estimated wind load, will result in an advancement of the counter, in an advancement step 240. Different upward increments can be assigned to different loading variables, by which the counter is then advanced in each case.

Figure 4:
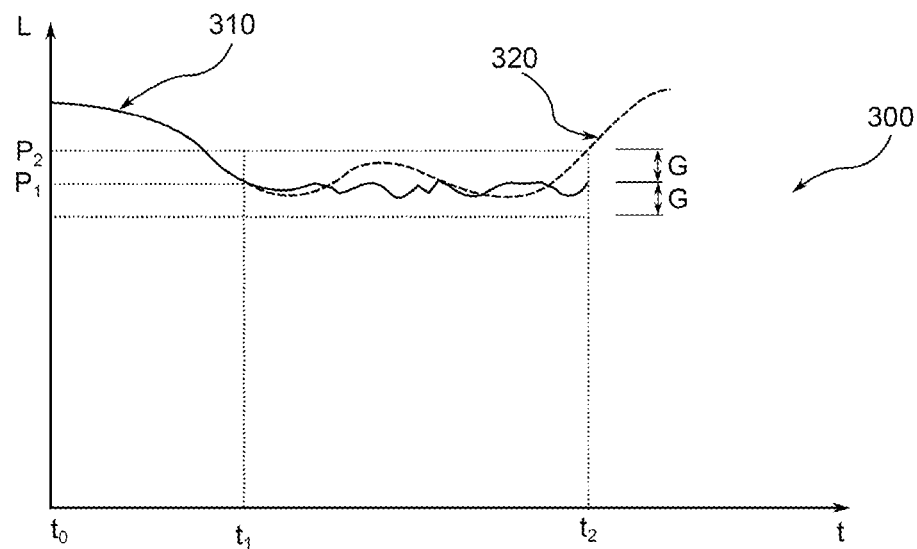
FIG. 4 shows a diagram for determining the check deviation.

FIG. 4 illustrates the determination of a check deviation in a projected loading variable. A coordinate system 300 is represented, in which the loading variable L is plotted on the x-axis, and the time t is plotted on the y-axis.

The measured sensor signal 310 is represented as a solid line. Also represented, by a broken line, with effect from the time point $t_1$, is the projected loading variable 320, i.e., the anticipated loading variable projected for the measurement direction of the load sensor.

In the region between time point to and time point $t_1$, the sensor signal continues to vary by a significant amplitude. At time point $t_1$, the sensor signal is detected as temporally constant. Time point $t_1$ is thus the time point of the most recent signal variation.

At time point $t_1$, i.e., the time point of the most recent signal variation of sufficient magnitude, the projected loading variable 320 assumes the value $P_1$. In successive sequential time steps, the check deviation is then determined as the difference between the current projected loading variable and the projected loading variable $P_1$ at the time point of the most recent signal variation $t_1$. Provided that the check deviation does not quantitatively exceed a limiting value G, it is anticipated that the sensor signal will be temporally constant.

At time point $t_2$, the projected loading variable 320 enters the tolerance range, and assumes an approximate value of $P_2=P_1+G$. For higher values of t, the projected loading variable lies outside the tolerance range. In consequence, the check deviation, with effect from time point $t_2$, quantitatively exceeds the limiting value G.

With effect from time point $t_2$, a variation in the sensor signal is thus anticipated. In the next anticipation step 220, it is thus detected that a constant sensor signal is not anticipated, and the advancement step 240 is executed. Between $t_1$ and $t_2$, an arbitrary number of time steps can be included. In theory, however, time point $t_2$ can also be the immediately succeeding time step, which follows time point $t_1$.

In the present example, a high degree of absolute coincidence between the sensor signal and the projected loading variable is also represented. However, as only the presence of variations in excess of threshold values is considered, this is not essential. The same result would be achieved if the sensor signal 310 and the projected loading variable 320 were to be mutually displaced in the direction of the x-axis.

Figure 5:
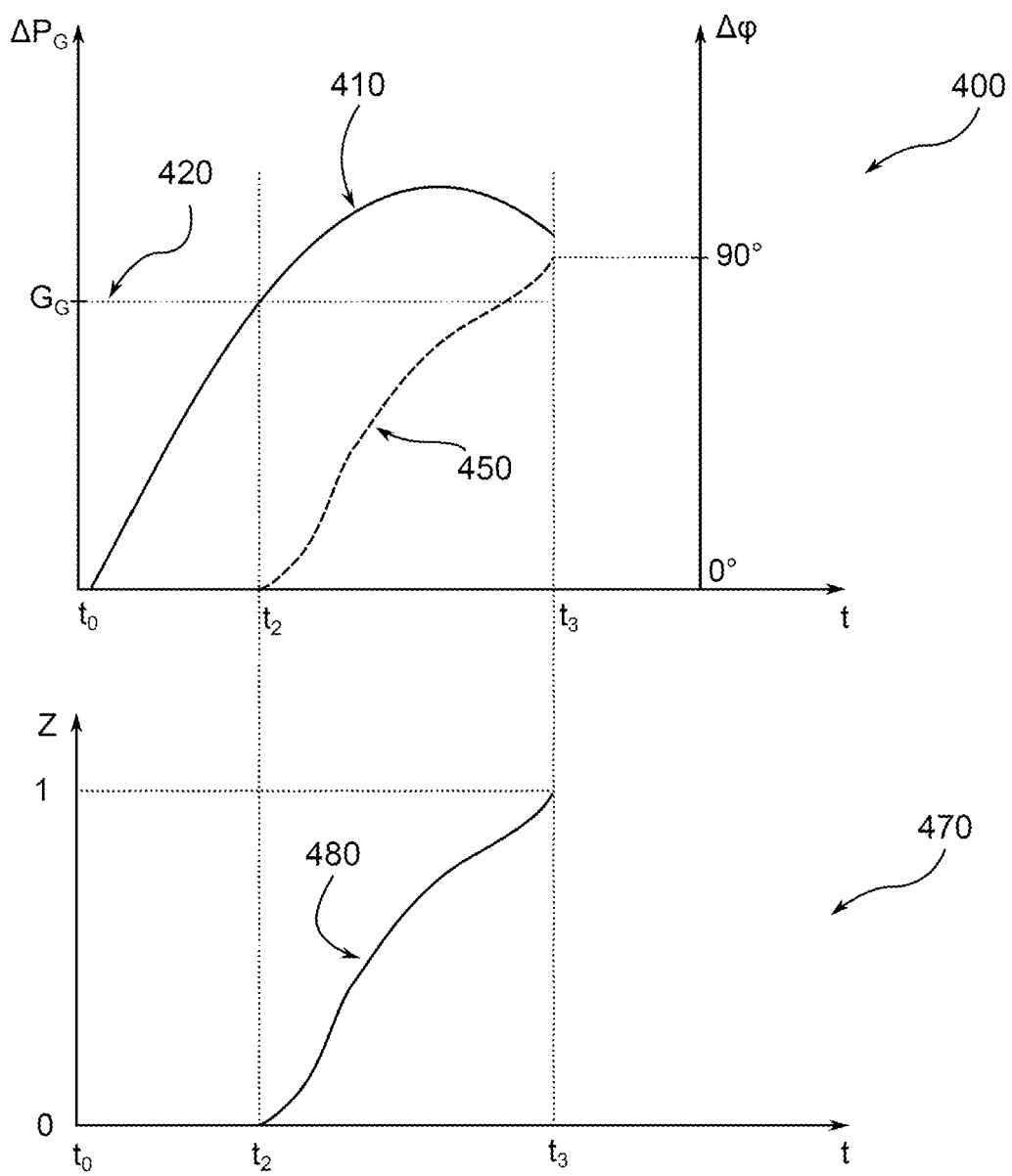
FIG. 5 shows the advancement of the counter in response to an anticipated gravitational load.

FIG. 5 shows an exemplary advancement of the counter, if only gravitational loads are acting on the rotor blade, or at least if only these loads are subject to variation. In the coordinate system 400, the check deviation for the gravitational load $\Delta P_G$ is plotted on the x-axis, against the time t on the y-axis.

The check deviation 410 thus determined is plotted as a time characteristic, together with a limiting value 420 of value $G_G$, upon the overshoot of which a variation in the sensor signal associated with gravitational loads applied is anticipated.

At time point $t_2$, the check deviation 410 exceeds the limiting value 420, such that a variation in the sensor signal is anticipated.

The coordinate system 400 additionally comprises a further x-axis for the variation of the rotor position $\Delta\varphi$. With effect from time point $t_2$, the variation of the rotor position is determined, i.e., the further rotation of the rotor blade, in degrees. The curve 450 shows an exemplary variation of the rotor position. A signal variation will be permissible, until such time as the rotor has rotated through a predefined angle, e.g., 90°. In the example, this is achieved at time point $t_3$.

The advancement of the counter Z is represented on the same time axis, below the check deviation characteristic. The counter or the selected upward increment, together with the threshold value, is correspondingly dimensioned such that a signal variation for a rotor rotation through 90° is permissible, before a sensor malfunction is identified. At time point $t_3$, the check deviation 410 for the time required to execute a rotor rotation through 90° with effect from time point $t_2$ exceeds the limiting value 420.

The coordinate system 470 thus represents the counter reading Z, plotted against the same time axis t. The counter 480 is standardized such that, upon the achievement of a value of 1, a sensor malfunction is identified.

With effect from time point $t_2$, the check deviation 410 exceeds the limiting value 420, such that the counter 480 is advanced. The upward increment by which the counter 480 is advanced is proportional to the variation in the rotor position, and is dimensioned such that the counter 480, directly upon the completion of a rotor rotation through 90°, i.e., at time point $t_3$, achieves the threshold value 1, and the sensor malfunction is identified.

Figure 6:
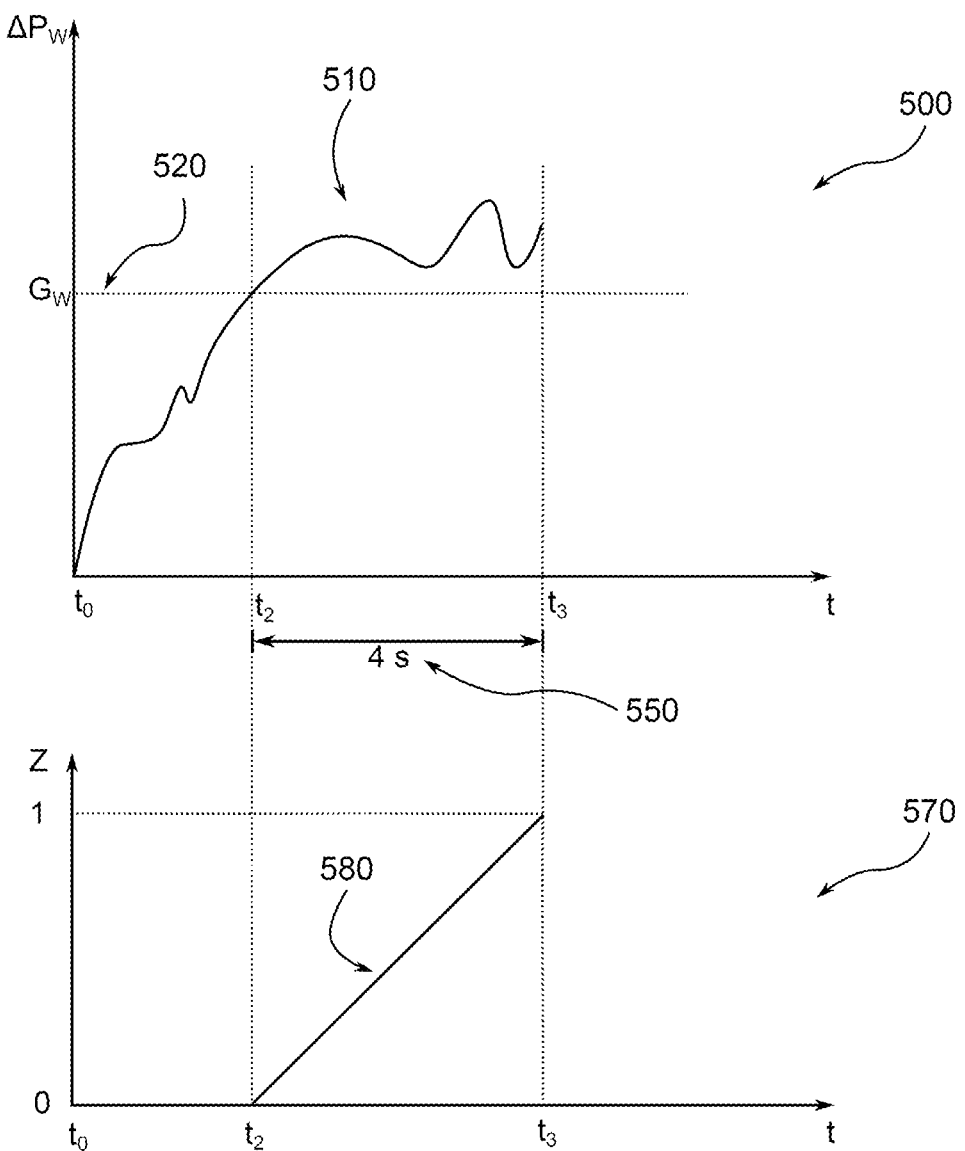
FIG. 6 shows the advancement of a counter in response to an anticipated wind load.

FIG. 6 shows a case in which only wind loads are acting on the rotor blade, or at least only these loads are subject to variation. In the diagram 500, the check deviation $\Delta P_w$ associated with estimated wind loads is plotted as a characteristic 510 against time t.

The check deviation 510 thus determined is plotted as a characteristic, and an associated limiting value 520 of value $G_w$ is also represented, with effect from the overshoot of which by the check deviation 510 a sensor variation will be anticipated. At time point $t_2$, the check deviation 510 exceeds the limiting value 520, such that a variation in the sensor signal is anticipated.

Advancement of the counter by the upward increment in response to wind loads is dimensioned such that an anticipated, but absent sensor variation is tolerated for a duration of 4 seconds, indicated by the time difference 550. At time point $t_3$, the check deviation 510 for a duration of 4 seconds exceeds the limiting value 520, such that a sensor malfunction is identified.

Moreover, in the coordinate system 570, a counter reading Z is also plotted against time t. Again, the counter 580 is standardized such that, upon the achievement of the threshold value 1, a sensor malfunction is identified. At time point $t_2$, the check deviation 510 exceeds the limiting value 520, resulting in the advancement of the counter 580. The upward increment by which the counter 580 is advanced in response to the action of wind loads is dimensioned such that the counter 580 achieves the threshold value 1 after 4 seconds, and the sensor malfunction is identified.

Figure 7:
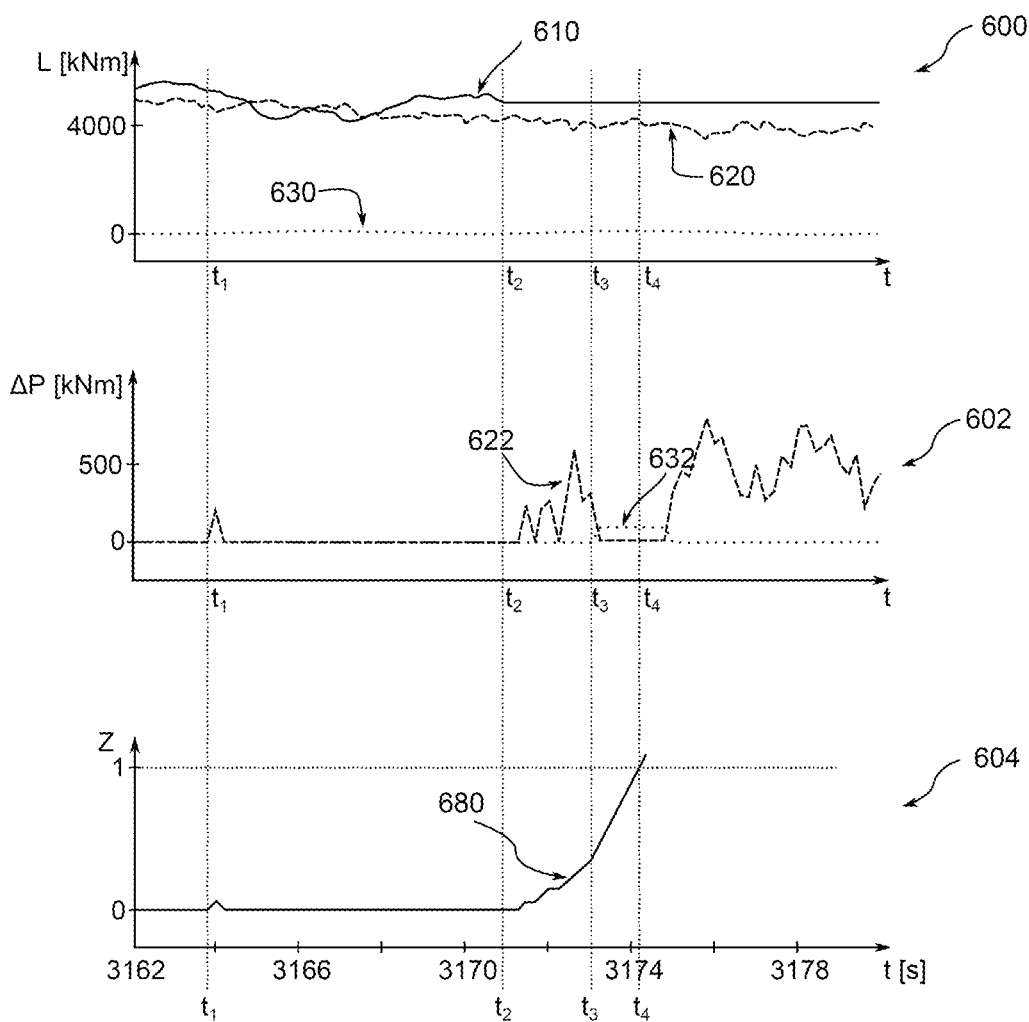
FIG. 7 shows time diagrams for the illustration of the advancement of a counter.

FIG. 7 illustrates the advancement of a counter, particularly the counter 580 represented in FIG. 6, and the identification of a sensor malfunction in accordance with both estimated loading variables, namely, the gravitational load and the wind load, wherein the simulation is based upon an actual situation.

To this end, FIG. 7 shows three coordinate systems 600, 602, 604 for the same time, which is respectively plotted on the y-axes of the coordinate systems 600, 602, 604.

In the uppermost coordinate system 600, the sensor signal 610 detected is represented by a solid line. Additionally, anticipated loading variables by way of the wind load 620 and the gravitational load 630 are represented by a broken line and a dotted line respectively. The unit of load is kNm.

At time point $t_2$, a constant sensor signal 610 is detected. The check deviation for the gravitational load is determined or evaluated accordingly. If the check deviation for the gravitational load lies below the limiting value, and thus does not result in the advancement of the counter, the check deviation for the wind load, namely, in the wind direction, is determined or evaluated instead. To this end, the anticipated gravitational load and the anticipated wind load are projected for the measurement direction of the load sensor and, in each case, a difference is taken from the projected loading variable at time point $t_2$, the time of the most recent signal variation.

The middle coordinate system 602 represents the check deviation ΔP thus determined in kNm for the wind load 622 (broken line) and the check deviation for the gravitational load 632 (dotted line). If the check deviation does not exceed the associated limiting value, there is no resulting advancement of the counter, and the check deviation is set to zero. However, this is represented by way of illustration only, in order to indicate which criterion results in the advancement of the counter.

Accordingly, the coordinate system 602 shows only the pro rata check deviation over time which exceeds the respective associated limiting value, and which results in the advancement of the counter on the grounds of the working point.

For the gravitational load and the wind load, different criteria are applied, or different design ratings are considered. For the gravitational load, the counter is advanced by an upward increment which is proportional to the rotation of the rotor, i.e., to the value of the further rotation of the rotor blade since the time point of the most recent signal variation. The upward increment is selected such that, at the latest, a sensor malfunction is detected further to a rotation through 90°, if a variation in the gravitational load is anticipated on a continuous basis.

The action of wind loads results in the advancement of the counter by a different upward increment. This is selected such that, in the absence of the action of gravitational loads, and thus the absence of any variation in gravitational loads, a sensor malfunction is detected after 4 seconds at the latest.

As both mechanisms result in the advancement of the same counter, the simultaneous action of variations in wind loads and gravitational loads can result in the more rapid identification of a sensor malfunction.

In the bottommost coordinate system 604, the counter reading Z is plotted against time t. The counter 680 is standardized such that a value of 1 results in the identification of a sensor malfunction, and the wind power installation is shut down.

Between time point $t_2$ and time point $t_3$, the check deviation 622 associated with wind loads results in the advancement of the counter 680 and, between $t_3$ and $t_4$, the check deviation 632 associated with gravitational loads results in the advancement of the counter 680.

At time point $t_1$, a short-term detection of a constant sensor signal is observed, notwithstanding the anticipation of a variation on the grounds of the check deviation 622. This would result in the advancement of the counter 680. However, the threshold value has not been achieved, and no sensor malfunction detected. Thereafter, the sensor signal shows a further variation, thereby resulting in the resetting of the counter such that, at time point $t_2$, a value of zero is resumed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   detecting a sensor malfunction of a load sensor of a wind power installation, the wind power installation having a rotor and a rotor blade, the detecting comprising:
   detecting a loading variable of the rotor blade via the load sensor, and
   wherein detecting the sensor malfunction comprises detecting a sensor signal of the load sensor that is functionally frozen, such that the sensor signal is temporally constant,
   estimating at least one loading variable of the rotor blade,
   in response to the sensor signal being temporally constant, executing a comparability test, in which according to the at least one estimated loading variable, a check is executed as to whether a non-constant sensor signal is to be anticipated,
   identifying a sensor malfunction based on the comparability test, and
   in response to identifying the sensor malfunction, performing at least one operation from a list comprising generating a warning message, shutting down the wind power installation, and switching operation of the wind power installation to a safe operating mode.

2. The method according to claim 1, wherein the load sensor is a strain measurement sensor and arranged on the rotor blade, wherein the strain measurement sensor is configured to detect a blade load based on strain in the rotor blade.

3. The method according to claim 1, wherein the at least one estimated loading variable is a gravitational load acting on the rotor blade, wherein a blade load is generated by a weight force acting on the rotor blade, and
   wherein the estimated gravitational load is determined based on a rotor position of the rotor.

4. The method according to claim 1, wherein the at least one estimated loading variable is a wind load acting on the rotor blade, wherein the wind load is dependent upon a wind speed, and wherein:

the wind load is determined based on a measured wind speed, and the measurement of wind speed comprises:
a LiDAR measurement, and/or
an anemometer measurement, or
the wind load is determined in accordance with a state variable which is dependent upon the wind speed, and the state variable comprises:
a generated power,
an acceleration power of the rotor, and/or
a generator torque detected.

5. The method according to claim 1, wherein, in the comparability test, the at least one estimated loading variable includes a first estimated loading variable and a second estimated loading variable, wherein a check is executed as to whether a sensor malfunction is present, wherein:
the first estimated loading variable is an estimated gravitational load, and
the second estimated loading variable is an estimated wind load.

6. The method according to claim 1, determining a projected loading variable based on the estimated loading variable projected for a measurement direction of the load sensor, and
wherein in the comparability test, according to the projected loading variable, a check is executed as to whether a non-constant sensor signal is to be anticipated.

7. The method according to claim 1, wherein if it has been detected that the sensor signal is temporally constant, in the comparability test executed according to the at least one estimated loading variable, and according to the at least one projected loading variable, it is determined whether a temporally non-constant sensor signal was anticipated, and
depending upon the anticipation of a temporally non-constant sensor signal a sensor malfunction is identified.

8. The method according to claim 1, wherein, in the comparability test for appraisal of whether a temporally non-constant sensor signal was to be anticipated,
a check deviation is generated as a difference between a projected loading variable at a current time point, and the projected loading variable for a time point at which the sensor signal was last not detected as temporally constant, and
the check deviation is compared with a specified limiting value, and
if the check deviation does not exceed the limiting value, it is expected that the sensor signal is temporally constant,
wherein different limiting values are specified for the different loading variables considered, and
wherein a different limiting value is specified in each case for the check deviation with respect to a gravitational load and for the check deviation with respect to the wind load.

9. The method according to claim 1, wherein if the sensor signal has been detected as temporally constant, but, by the execution of the comparability test, it is established that a temporally constant signal was not anticipated, a counter is advanced,
wherein a sensor malfunction is identified, if the counter has achieved a stipulated threshold value.

10. The method according to claim 9, wherein:
if, during the comparability test, detecting that the sensor signal has changed, then the counter is reset, or
if the sensor signal has been detected as constant, and a constant sensor signal is anticipated, the counter is left at its current reading.

11. The method according to claim 9, wherein in the comparability test, if the sensor signal is constant, a gravitational load comparison, by way of a comparison with an estimated gravitational load, and a wind load comparison, by way of a comparison with an estimated wind load is executed,
wherein in each case, an identical or the same counter are respectively advanced by one upward increment, if it is established that a non-constant sensor signal is anticipated, and wherein a sensor malfunction is assumed, if the counter has achieved a threshold value,
wherein in the gravitational load comparison, a different upward increment is applied to than employed in the wind load comparison.

12. The method according to claim 1, wherein the sensor signal is greater than a decibel threshold, and
wherein the load sensor is considered functionally frozen such that the sensor signal is temporally constant if a predefinable fluctuation amplitude or variation amplitude is not quantitatively exceeded.

13. A wind power installation comprising:
a measurement and control device configured to execute the method according to claim 1,
a tower,
the rotor,
the load sensor, and
the rotor blade.

* * * * *